Patented May 12, 1925.

1,537,297

UNITED STATES PATENT OFFICE.

WILLIAM C. GEER AND HAROLD GRAY, OF AKRON, OHIO, ASSIGNORS TO THE B. F. GOODRICH COMPANY, OF NEW YORK, N. Y., A CORPORATION OF NEW YORK.

METHOD OF PRODUCING EBONITE SHEET.

No Drawing.    Application filed August 25, 1923.  Serial No. 659,244.

*To all whom it may concern:*

Be it known that we, WILLIAM C. GEER and HAROLD GRAY, citizens of the United States, residing at Akron, in the county of Summit and State of Ohio, have invented a certain new and useful Method of Producing Ebonite Sheet, of which the following is a specification.

Our invention relates to the art of producing ebonite or hard rubber sheet by the vulcanization of superimposed layers of sheeted, hard-rubber compound, as in the manufacture of battery separator sheets.

Heretofore, so far as we are aware, it has been found necessary to vulcanize the superimposed sheets in flat condition and to separate them with sheet metal such as tin, to prevent their adhesion to each other during vulcanization. It has been a common custom to cut the calendered ebonite stock into rectangular pieces, and to stack them alternately with sheets of tin, and after vulcanization it has been necessary to separate the stacked, alternate layers of ebonite and sheet metal, such procedure requiring a large amount of manual labor.

Another disadvantage is the high percentage of waste incident to the subsequent cutting of the rectangular sheets thus produced into smaller units for use, as in the production of separator plates for battery jars or other units of such size or form as may not be cut from stock sheets of standard size without waste.

Vulcanization of continuous sheets of ebonite, rolled on a drum or mandrel, heretofore has been found impractical, so far as we are aware, due to the soft, sticky nature of the ebonite compositions heretofore used, during the first part of the vulcanization process. When dusted with soapstone or starch, the powder has been absorbed by the ebonite, the plies then adhering to each other in a solid mass. When separated by liners of fabric or paper the sheets have adhered to the same and an inferior or valueless product has resulted. Calendering uncured ebonite onto continuous sheets of tin to permit vulcanization of the sheeted stock in rolled form has not heretofore been found practical due to the warping, buckling and stretching of the sheet metal during the calendering operation.

The object of our invention is to provide an improved method for producing ebonite, more particularly in sheet form, whereby labor and material may be saved and other advantages obtained.

We find that by stiffening the ebonite composition with a large proportion of suitable pigment or stiffening material, such for example as clay, antimony sulfides, lithopone, lime or zinc oxide, as described more in detail in the co-pending application of Harold Gray, Serial No. 645,367, filed June 14, 1923, then sheeting the highly pigmented stock, rolling it upon a support with intervening layers of material, such as soapstone or fabric, and then vulcanizing the rolled sheet, a good vulcanized product may be obtained without undue adhesion of the successive convolutions of sheeted material to each other or to the material used to separate them.

In our preferred practice for producing battery-jar separator sheet, for example, we prepare an ebonite compound containing such amount of stiffening material as to cause it to be non-adhesive throughout the subsequent vulcanization thereof. The proportions may vary according to the material used. In the case of clay, for example, we find that 35 to 65 parts by weight of clay to 100 parts of rubber gives a satisfactory result. We then sheet the stock upon a calendar, and as the highly pigmented ebonite sheet comes from the calendar we dust it with soapstone or other rubber-dusting material and roll it up on a mandrel or drum, either with or without intervening layers of fabric, paper, tin or the like, the intervening sheet of material, when used, being associated with the stock after the calendering of the latter, as distinguished from the impractical procedure of calendering the stock directly onto the metal sheet or vulcanizing, in direct contact with fabric, compounds such as heretofore have been used. The entire drum is then placed in a heater and the ebonite vulcanized by the application of heat in any desired manner. On removal from the heater, the vulcanized sheet may be unrolled without adhesion between adjacent layers thereof or between the ebonite and the liner when a liner is used.

We do not wholly limit ourselves to the use of ebonite mixes which are highly pigmented throughout the thickness of the sheet, since a highly pigmented layer may be produced on the surface of the sheet which will give the desired effect. Where the ebonite sheet is built up by plying up a plurality of thin sheets, the outside plies may be charged with a higher content of pigment than is present in the inside layers, and the desired result may thereby be obtained.

In the case of thin ebonite sheet such as is used for battery separators, such curvature as is present in the relatively small units cut from the vulcanized sheet is not objectionable, particularly when the curvature is slight, as when the stock is vulcanized on a large drum. Where curvature is objectionable, the vulcanized sheet may be unrolled while warm or may be unrolled cold and allowed to flatten out on a warm surface.

The vulcanized sheet, being supplied in long lengths, may be cut into individual units with a minimum of waste.

We claim:

1. The method of producing ebonite sheet which comprises vulcanizing sheeted stock in rolled form, successive convolutions of the stock being separated only by a layer of rubber-dusting powder, and at least surface regions of the stock having incorporated therein an amount of stiffening material sufficient to cause the stock to be non-adhesive throughout the period of vulcanization.

2. The method of producing ebonite sheet which comprises mixing into an ebonite compound such proportions of stiffening material as to prevent adhesiveness of the compound during vulcanization, forming an ebonite sheet at least with outer layers of the stiffened mixture, applying to the sheeted stock a surface coating of rubber-dusting powder, superimposing the sheeted stock upon itself in layers without other separating material, and vulcanizing the stock in this form.

3. The method of producing ebonite sheet which comprises building up a sheet of ebonite stock by plying up a plurality of thin sheets, the outside plies being formed of a stock in which is incorporated a sufficient amount of stiffening material to cause the ebonite sheet to be non-adhesive throughout the period of vulcanization, applying to the sheeted stock thus formed a surface coating of rubber-dusting powder, and vulcanizing the stock in superimposed layers.

In witness whereof we have hereunto set our hands this 14th day of August, 1923.

WILLIAM C. GEER.
HAROLD GRAY.